US009668402B2

(12) United States Patent
Hagny

(10) Patent No.: US 9,668,402 B2
(45) Date of Patent: Jun. 6, 2017

(54) SEED BOUNCE FLAP FOR AGRICULTURAL SEEDER

(71) Applicant: Matthew P Hagny, Bel Aire, KS (US)

(72) Inventor: Matthew P Hagny, Bel Aire, KS (US)

( * ) Notice: Subject to any disclaimer, the term of this patent is extended or adjusted under 35 U.S.C. 154(b) by 150 days.

(21) Appl. No.: 14/591,724

(22) Filed: Jan. 7, 2015

(65) Prior Publication Data

US 2016/0192582 A1 Jul. 7, 2016

(51) Int. Cl.
A01C 5/06 (2006.01)

(52) U.S. Cl.
CPC ............... *A01C 5/068* (2013.01); *A01C 5/06* (2013.01)

(58) Field of Classification Search
USPC .................................................. 111/150, 189
See application file for complete search history.

(56) References Cited

U.S. PATENT DOCUMENTS

| 1,693,318 | A | * | 11/1928 | Shell .................. A01C 5/066 111/190 |
| 2,533,374 | A | * | 12/1950 | Hyland ................. A01C 5/06 111/150 |
| 2,554,205 | A | * | 5/1951 | Oehler .................. A01C 5/062 111/150 |
| 5,092,255 | A | | 3/1992 | Long et al. |
| 5,673,638 | A | * | 10/1997 | Keeton ................ A01C 5/066 111/167 |
| 6,178,901 | B1 | * | 1/2001 | Anderson ............... A01C 5/06 111/150 |
| 6,283,050 | B1 | * | 9/2001 | Schaffert ............... A01C 7/201 111/150 |
| 6,314,897 | B1 | | 11/2001 | Hagny |
| 7,168,376 | B2 | | 1/2007 | Johnston |
| 2005/0263053 | A1 | * | 12/2005 | Schaffert .............. A01C 5/06 111/189 |
| 2010/0229770 | A1 | * | 9/2010 | Hagny .................. A01C 5/064 111/163 |
| 2014/0209001 | A1 | * | 7/2014 | Schaffert ............... A01C 7/201 111/200 |

OTHER PUBLICATIONS

Needham AG Technologies, LLC, Innovating for Future Growth, Phil Needham, Bonilla Seed Tabs, pp. 4 & 12, 2014.

* cited by examiner

*Primary Examiner* — Alicia Torres
(74) *Attorney, Agent, or Firm* — Jeffrey L. Thompson; Thompson & Thompson, P.A.

(57) ABSTRACT

A seed bounce flap for an agricultural seeder is provided for preventing bouncing of seeds in a furrow created by a furrow opener assembly with a seed channel defined by a rearwardly angled seed tube and seed boot. The seed bounce flap has a first mounting portion attached to an upper wall of the seed boot and a second flexible portion extending generally downwardly from the first portion. The second portion of the seed bounce flap is angled relative to the first portion so that the second portion is more vertical than the first portion. The seed bounce flap is flexible in a fore-and-aft direction and has tapering right and left sides that converge toward each other at a lower end of the seed bounce flap to conform to the shape of the furrow. The seed bounce flap can be made of an injection molded plastic material.

15 Claims, 4 Drawing Sheets

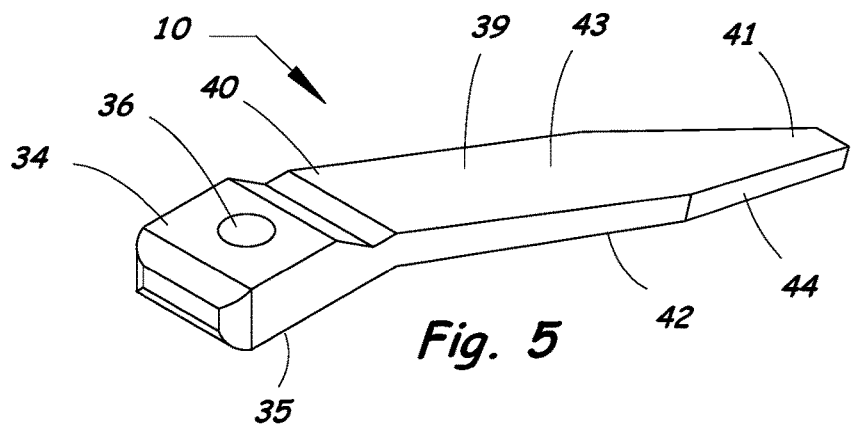
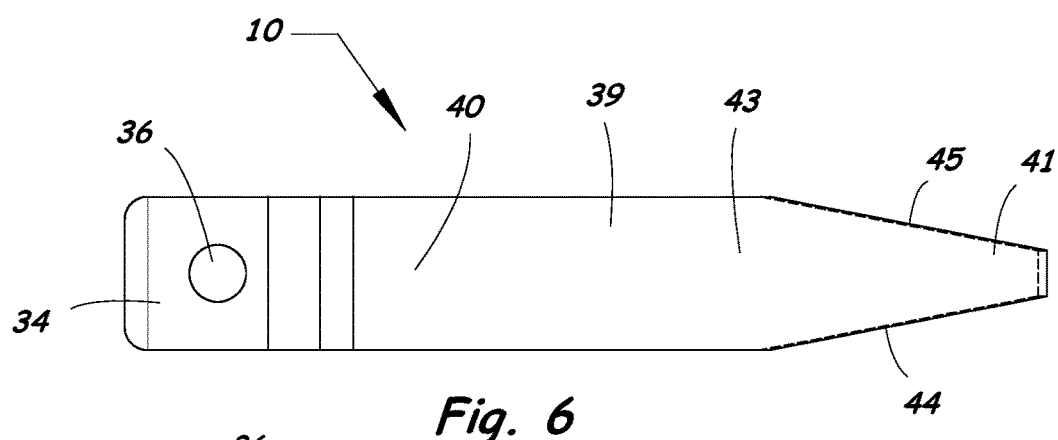
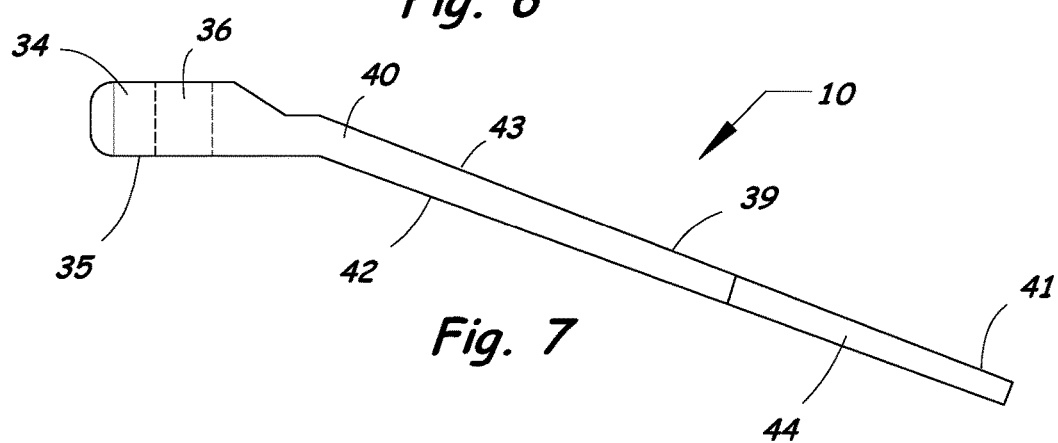

SEED BOUNCE FLAP FOR AGRICULTURAL SEEDER

BACKGROUND OF THE INVENTION

Field of the Invention

The present invention relates generally to agricultural seeders, and in particular, to an attachment for a seed boot of a furrow opener assembly to prevent seed bounce and provide improved seed placement.

Description of the Prior Art

Seed placement by furrow opener assemblies on agricultural seeders is important to achieving uniform crop emergence. After creating a V-shaped furrow with an opener blade, the seed must be consistently delivered to the bottom of the furrow. A seed tube and/or boot is used to control the seed drop from a seed metering system into the furrow alongside the opener blade. A flexible seed boot extension or flap is often hung off of the back of the boot or seed tube to reduce seed bounce out of the furrow.

A compounding problem is that manufacturers have made the seed tube and internal channel of the seed boot with a rearward angle (e.g., 45 degrees from vertical in the John Deere Models 750/1850, 1560/1860 and 1590/1890 and similar grain drills) to impart a rearward "throwing" of the seed at the bottom of the seed tube in an attempt to minimize seed bounce resulting from the difference between the forward speed of the planter or drill (and seed) and the stationary soil. This severe rearward angle exacerbates seeds bouncing, being blown out of the furrow by the air stream on air drills, and/or being flung out of the furrow by the rotation of the opener blade.

There is a need in the industry for an improved seed bounce flap for such agricultural seeders.

SUMMARY OF THE INVENTION

An object of the present invention is to provide an attachment for a furrow opener assembly that improves seed placement to encourage uniform seed emergence.

A further object of the present invention is to provide an improved seed bounce flap for use with a conventional furrow opener assembly to minimize seed bounce and blow out.

A further object of the present invention is to provide an improved seed bounce flap that can be mounted to a conventional seed boot of an opener assembly in place of an OEM seed boot extension.

To accomplish these and other objects of the invention, a seed bounce flap is provided for an agricultural seeder for preventing bouncing of seeds out of a furrow created by a furrow opener assembly with a rearwardly angled seed tube and/or seed boot. The seed bounce flap has a first mounting portion attached to an upper wall of the seed boot near the exit point of the seed-delivery channel. The first mounting portion has a mounting surface that engages the upper wall of the seed boot. The seed bounce flap has a second flexible portion extending generally downwardly from the first mounting portion. The second portion is angled relative to the first portion so that a front side of the second portion is more vertical than the mounting surface of the first portion. In one embodiment, the second portion of the seed bounce flap extends at a forward angle of approximately 160 degrees relative to the first portion when the flexible seed flap is in a relaxed condition, i.e., during field operation, the second portion is 20 degrees more vertically oriented than if the flap was essentially flat when relaxed. The seed bounce flap is flexible in a fore-and-aft direction and has tapering right and left sides that converge toward each other at a lower end of the seed bounce flap to conform to the shape of the furrow. The seed bounce flap can be made of an injection molded plastic material.

According to one aspect of the present invention, an opener assembly for an agricultural seeder is provided, comprising: a cast-iron seed boot with a seed channel for directing seeds downwardly and rearwardly into a furrow, the seed boot having an upper wall defining an upper boundary of the seed channel but which terminates a couple inches above the bottom of the furrow to prevent clogging with soil and mud; and a flexible seed bounce flap attached to the seed boot for preventing bouncing of seeds out of the furrow as the seeds are directed therein, the seed bounce flap having a first portion engaged with the upper wall of the seed boot and a second portion extending generally downwardly from the first portion, the second portion being angled relative to the first portion so that second portion (especially the upper half of the second portion) is more vertical than the first portion during field operation. Herein, seeds bouncing "out of" the furrow also refers to seeds bouncing excessively but ultimately coming to rest within the furrow confines, although in a delayed manner so as to allow more sidewall and dust to fall into the furrow ahead of the seed which is also undesirable, i.e., the seed is positioned much more shallow than it would have been if the bounce was reduced.

According to another aspect of the present invention, a seed bounce flap for use in an agricultural seeder is provided, comprising: a first mounting portion comprising a mounting surface adapted to engage an upper wall of a seed boot; and a second flexible portion having a proximal end adjacent to the first mounting portion and a distal end, the second portion having a front side, a rear side, and right and left sides, the second portion having a first dimension between the front and rear sides that is substantially thinner than a second dimension between the right and left sides to provide greater flexibility in a fore-and-aft direction than in a side-to-side direction. The mounting surface of the first mounting portion and the front side of the second flexible portion are angled relative to each other to cause the front side to be more vertical than the mounting surface when in use.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 5 is a perspective view of the seed bounce flap of the present invention.

FIG. 6 is a plan view of the seed bounce flap of the present invention.

FIG. 7 is a side view of the seed bounce flap of the present invention.

DETAILED DESCRIPTION OF THE PREFERRED EMBODIMENTS

A seed bounce flap 10 for an agricultural seeder according to the present invention will now be described with reference to FIGS. 1 to 7 of the accompanying drawings.

Figure 1:
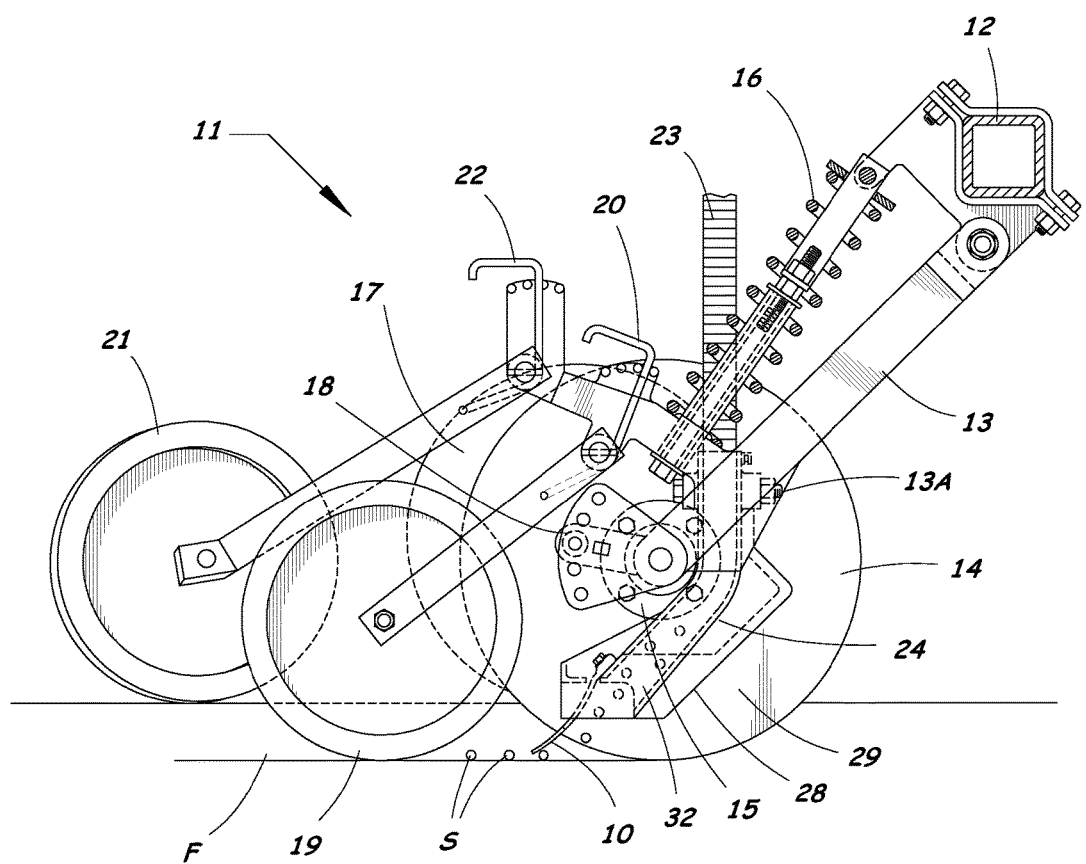
FIG. 1 is a side view of an opener assembly for an agricultural seeder having a seed boot equipped with a seed bounce flap of the present invention.
Figure 2:
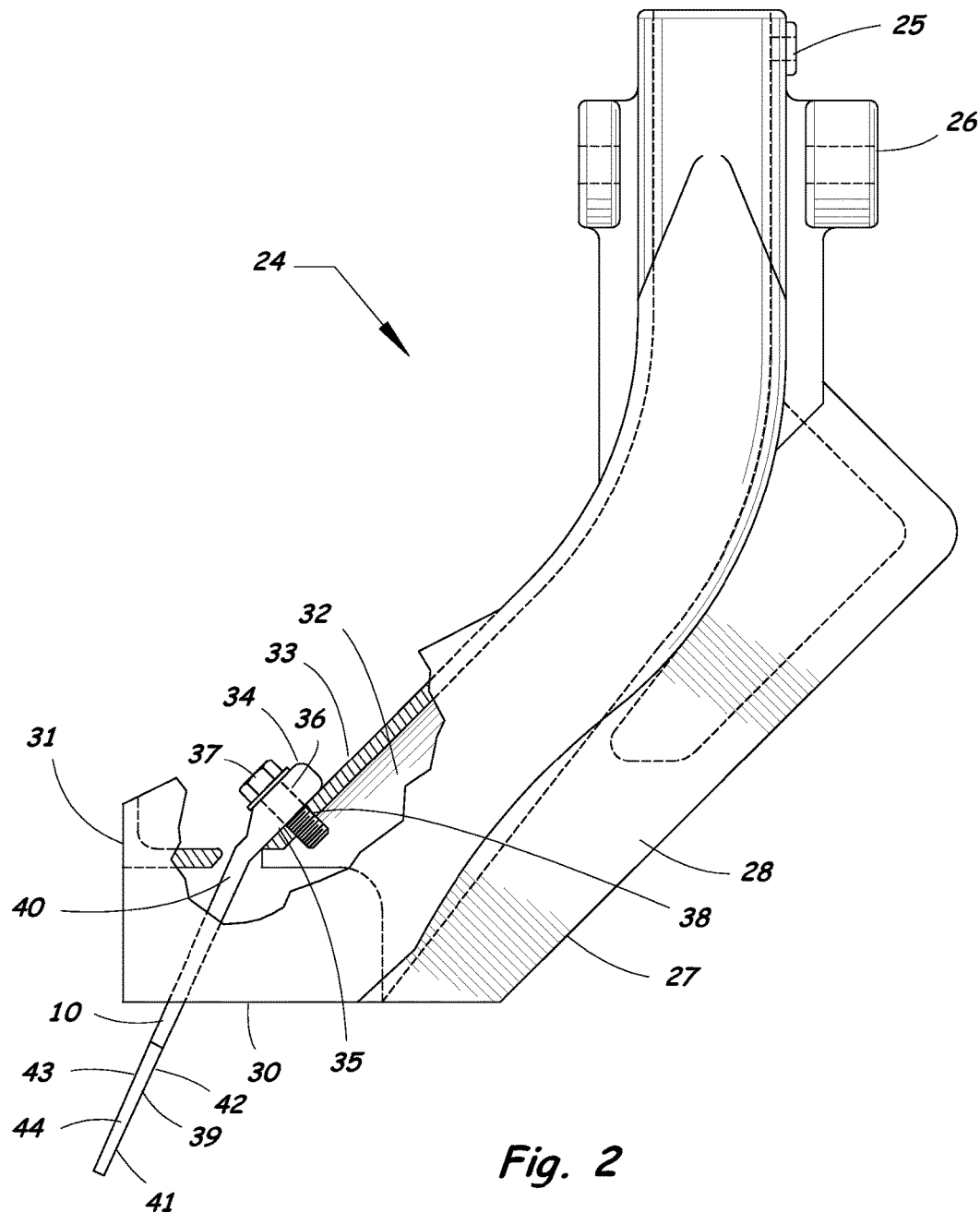
FIG. 2 is a side view of the seed boot equipped with the seed bounce flap of the present invention.

An opener assembly 11 for an agricultural seeder is illustrated in FIG. 1. The opener assembly 11 includes a torque tube 12 (a.k.a. rockshaft), an opener arm 13 pivotally connected to the rockshaft 12, and an angled opener disk 14 mounted to a hub 15 on the opener arm 13. A down-pressure spring assembly 16 provides an adjustable down-force on the opener disk 14 via the rotation of rockshaft 12. A gauge wheel 17 is supported for rotation adjacent to the opener disk 14 to maintain a desired depth of operation. An adjustment mechanism 18 is provided for adjusting the gauge wheel 17 vertically with respect to the opener disk 14 to change the depth of operation.

A firming wheel 19 follows behind the opener disk 14 for firming the seeds S into soil in the bottom of the furrow F created by the opener disk 14 to provide good seed-to-soil contact in the furrow F. A firming adjustment mechanism 20 allows the down-force on the firming wheel 19 to be adjusted.

A closing wheel 21 follows behind the firming wheel 19 for crushing the side of the furrow F to provide a layer of soil over the seeds S deposited in the furrow F.

A closing adjustment mechanism 22 allows the down-force on the closing wheel 21 to be adjusted.

A seed tube 23 and seed boot 24 are provided for directing seeds downwardly and rearwardly into the furrow F created by the opener disk 14. The seed boot 24 includes an upper portion 25 (see FIG. 2) with bracket ears/flanges 26 which connect to the opener arm 13 via a bolt 13A (FIG. 1), and a lower portion 27 with a flat face 28 to mate against the inside surface 29 of the opener disk 14. "Inside surface" 29 is in the "shadow" of the cut being made by the opener disk 14; i.e., the soil is being pushed away from the shadow of the cut by virtue of the blade's slight angle to the direction of travel. The lower portion 27 of the seed boot 24 terminates in a lower horizontal edge 30 and a rear vertical edge 31. A seed drop-path defined by an internal channel 32 of the seed boot 24 extends downwardly and rearwardly around the hub 15 of the opener disk 14 and then at an angle of approximately 45 degrees relative to horizontal at its lower end. An upper wall 33 of the seed boot 24 defines an upper boundary of the seed channel 32. The upper wall 33 extends at an angle of approximately 45 degrees relative to horizontal.

The seed bounce flap 10 is a flexible member attached to trail below and/or behind the seed boot 24 for preventing seeds S from bouncing out of the furrow F beyond the lower end of the seed channel 32 through the seed boot 24. The seed bounce flap 10 can be made of molded plastic material using an injection molding process.

The seed bounce flap 10 has a first mounting portion 34 with a mounting surface 35 engaged with the upper wall 33 of the seed boot 24. The first mounting portion 34 has a mounting hole 36 formed therein. A threaded fastener 37 extends through the mounting hole 36 into a corresponding hole 38 in the seed boot 24 to secure the seed bounce flap 10 to the seed boot 24.

A second flexible portion 39 of the seed bounce flap 10 extends generally downwardly from the first mounting portion 34. The second flexible portion 39 has an upper end 40 adjacent to and extending downwardly from the first mounting portion 34, and a lower end 41 extending downwardly from the seed boot 24 for operating in the furrow F. The second portion 39 has a front side 42, a rear side 43, and right and left sides 44, 45. A first dimension between the front and rear sides 42, 43 is substantially smaller than a second dimension between the right and left sides 44, 45 to provide greater flexibility in a fore-and-aft direction than in a side-to-side direction.

The first portion 34 of the seed bounce flap 10 is thicker than the second portion 39 for added strength in the mounting area. The second portion 39 has a thickness that tapers from its upper end 40 to its lower end 41 to encourage flexing primarily at the lower end 41 rather than upper end 40, which keeps the more vertical aspect to deflect more seeds S downward into the bottom of furrow F. The right and left sides 44, 45 converge toward each other at a lower end portion of the seed bounce flap 10 to conform to the 'V' shape of the furrow F.

The mounting surface 35 of the first mounting portion 34 and a longitudinal centerline of the front side 42 of the second flexible portion 39 are angled relative to each other to cause the longitudinal centerline of the front side 42 of the second flexible portion 39 to be more vertical than the mounting surface 35 of the first mounting portion 34. In one embodiment, the longitudinal centerline of the front side 42 of the second portion 39 extends at an angle of approximately 160 degrees relative to the mounting surface 35 of the first portion 34 when the seed bounce flap 10 is in a relaxed condition, as shown in FIGS. 2, 3, 5 and 7.

Figure 3:
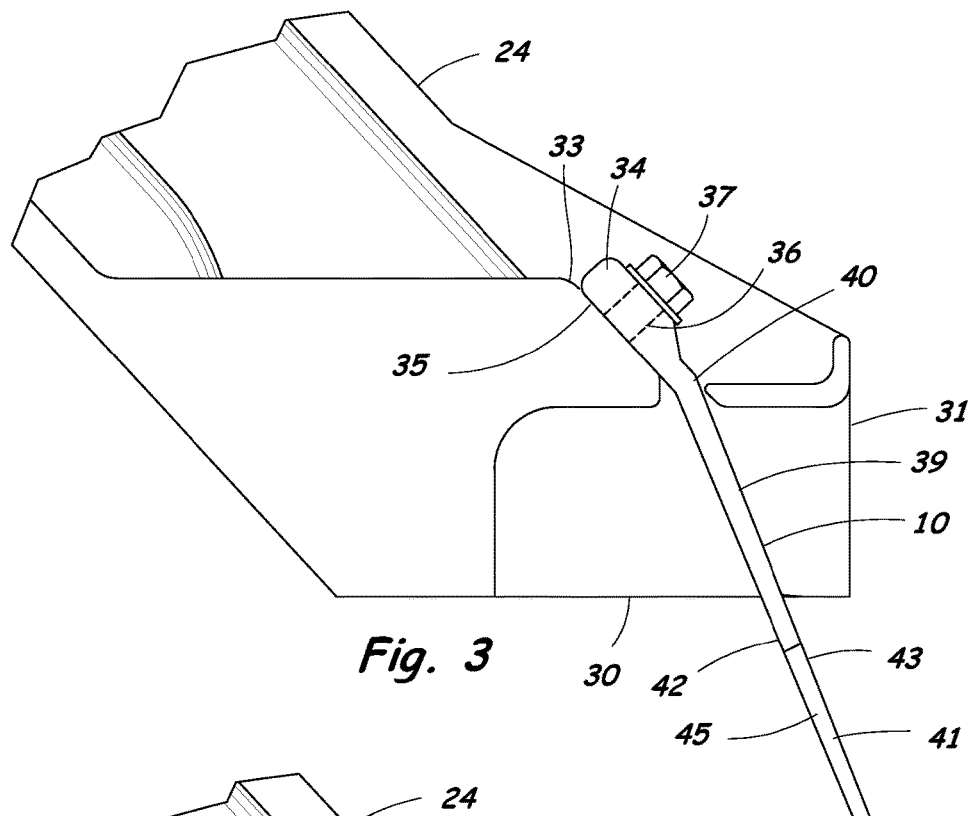
FIG. 3 is a detail zoom view of the lower portion of the seed boot and the seed bounce flap of the present invention from the same perspective as FIG. 2.
Figure 4:
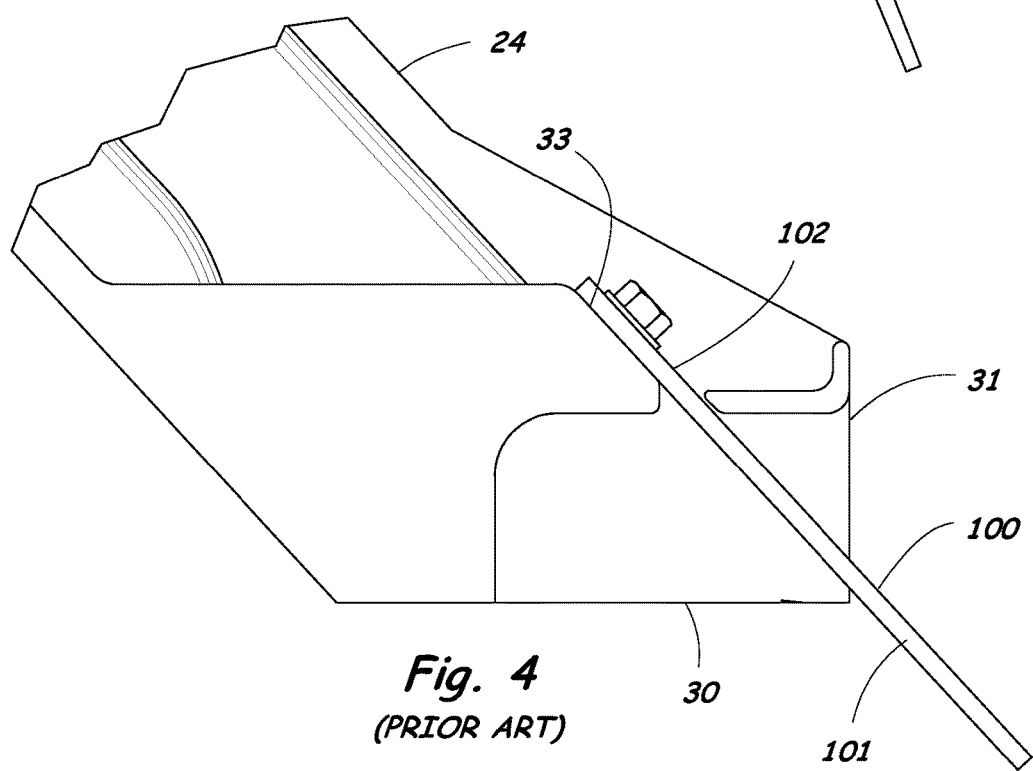
FIG. 4 is a detail view of the lower portion of a seed boot equipped with a conventional seed boot extension.

FIGS. 3 and 4 further illustrate the difference between the seed bounce flap 10 of the present invention (FIG. 3) and the conventional seed boot extension 100 (FIG. 4).

The conventional seed boot extension 100 is a straight member in which the lower portion 101 of the extension extends at the same angle as the upper mounting portion 102. Because the seed boot extension 100 is usually formed from a moderately stiff UHMW such as nylon, and because it drags on the sidewalls of furrow F, seed boot extension 100 may cold-flow or bend into a slight arc (beginning at or near its attachment point) so as to be even more horizontal than when pristine or new, which creates an even larger gap for seeds to escape.

In contrast, the forward angle of the seed bounce flap 10 of the present invention provides a more vertical orientation of the flexible lower portion 39 (especially the upper half of lower portion 39) of the seed bounce flap 10, which helps to eliminate a gap in the conventional arrangement that allowed seeds to escape, and also provides a more effective surface for directing the seeds S into the bottom of the furrow F after the seeds are discharged from the lower end of the seed boot 24. The flexible nature of the material, along with the previously described tapering in a fore-aft dimension of the lower portion 39 of the flap 10, helps ensure that any dragging of the left/right edges 44, 45 on the sidewalls of the furrow F will result in primarily the lower half of the lower portion 39 being bent rearwardly; thus the more vertical dimension of the upper half of lower portion 39 is preserved.

While the invention has been specifically described in connection with specific embodiments thereof, it is to be understood that this is by way of illustration and not of limitation, and the scope of the appended claims should be construed as broadly as the prior art will permit.

What is claimed is:

1. An opener assembly for an agricultural seeder, comprising:
    a seed boot with a seed channel for directing seeds downwardly and rearwardly into a furrow, the seed boot having an upper wall defining an upper boundary of the seed channel;
    a flexible seed bounce flap attached to said seed boot for preventing bouncing of seeds out of the furrow as the seeds are directed therein, said seed bounce flap having a first portion engaged with said upper wall of the seed boot and a second portion extending generally downwardly from said first portion, said second portion being angled relative to said first portion so that said second portion is more vertical than said first portion;
    said first portion of said seed bounce flap comprises a mounting surface engaged with the upper wall of said seed boot;
    said second portion of said seed bounce flap comprises a proximal end adjacent to said first portion, a distal end, and a front side with a longitudinal centerline that extends from said proximal end to said distal end, said longitudinal centerline being more vertical than said mounting surface of the first mounting portion.

2. The opener assembly according to claim 1, wherein said second portion extends at an angle of approximately 160 degrees relative to said first portion when said seed bounce flap is in a relaxed condition.

3. The opener assembly according to claim 1, wherein said seed bounce flap comprises an injection molded plastic material.

4. The opener assembly according to claim 1, wherein said upper wall of said seed boot and said first portion of said seed bounce flap both extend at an angle of approximately 45 degrees relative to horizontal.

5. The opener assembly according to claim 1, wherein said second portion has a rear side, and right and left sides, and wherein said right and left sides converge toward each other at a lower end portion of the seed bounce flap to conform to the shape of the furrow.

6. The opener assembly according to claim 5, wherein said second portion has a first dimension between said front and rear sides that is substantially thinner than a second dimension between said right and left sides to provide a structure with greater flexibility in a fore-and-aft direction than in a side-to-side direction.

7. The opener assembly according to claim 1, wherein said first portion of said seed bounce flap is thicker than said second portion.

8. The opener assembly according to claim 1, wherein said second portion has a thickness in a fore-and-aft direction that tapers from a thicker upper end of said second portion to a thinner lower end thereof.

9. The opener assembly according to claim 1, wherein said first portion has a mounting hole formed therein, and further comprising a threaded fastener extending through said mounting hole into a corresponding hole in said seed boot to secure said seed bounce flap to said seed boot.

10. The opener assembly according to claim 1, wherein said second portion has a rear side, and right and left sides, said second portion having a first dimension between said front and rear sides that is substantially thinner than a second dimension between said right and left sides to provide greater flexibility in a fore-and-aft direction than in a side-to-side direction.

11. The opener assembly according to claim 10, wherein said mounting surface and said longitudinal centerline of said front side are angled approximately 160 degrees relative to each other.

12. The opener assembly according to claim 10, wherein said right and left sides converge toward each other at a distal end of the seed bounce flap from said first portion.

13. The opener assembly according to claim 10, wherein said first portion of said seed bounce flap is thicker in a fore-and-aft direction than said second portion.

14. The opener assembly according to claim 10, wherein said second portion has a thickness that tapers from a thicker upper end adjacent to said first portion to a thinner lower end distal from said first portion.

15. The opener assembly according to claim 10, wherein said first portion has a mounting hole formed therein.

* * * * *